US012786498B2

(12) United States Patent
Huang et al.

(10) Patent No.: US 12,786,498 B2
(45) Date of Patent: Nov. 3, 2026

(54) MULTIMODAL MULTIMEDIA PROCESSING FOR WEARABLE DEVICE

(71) Applicant: Zepp, Inc., Cupertino, CA (US)

(72) Inventors: Wang Huang, Hefei (CN); Kongqiao Wang, Cupertino, CA (US)

(73) Assignee: Zepp, Inc., Milpitas, CA (US)

( * ) Notice: Subject to any disclaimer, the term of this patent is extended or adjusted under 35 U.S.C. 154(b) by 63 days.

(21) Appl. No.: 18/772,870

(22) Filed: Jul. 15, 2024

(65) Prior Publication Data

US 2026/0019658 A1 Jan. 15, 2026

(51) Int. Cl.

*H04N 21/414* (2011.01)
*H04N 21/4223* (2011.01)
*H04N 21/8547* (2011.01)

(52) U.S. Cl.

CPC ... *H04N 21/41407* (2013.01); *H04N 21/4223* (2013.01); *H04N 21/8547* (2013.01)

(58) Field of Classification Search

CPC ......... H04N 21/41407; H04N 21/4223; H04N 21/8547

See application file for complete search history.

(56) References Cited

U.S. PATENT DOCUMENTS

| | | | | |
|---|---|---|---|---|
| 2016/0150196 | A1* | 5/2016 | Horvath | H04N 23/66 348/211.4 |
| 2021/0327245 | A1* | 10/2021 | Addison | G08B 21/182 |
| 2022/0405507 | A1* | 12/2022 | Verma | G06F 18/2178 |
| 2024/0362272 | A1* | 10/2024 | Lee | G06F 40/40 |
| 2024/0386636 | A1* | 11/2024 | Yamasaki | G06F 3/013 |

FOREIGN PATENT DOCUMENTS

| | | | |
|---|---|---|---|
| CN | 103064188 | A | 4/2013 |
| CN | 109690686 | A | 4/2019 |

* cited by examiner

*Primary Examiner* — Joshua D Taylor
(74) *Attorney, Agent, or Firm* — Young Basile Hanlon & MacFarlane, P.C.

(57) ABSTRACT

A method of multimodal multimedia processing for at least one wearable device comprising an image sensor and at least one processor. The method includes in response to the image sensor being turned on, obtaining a first measurement of at least one of a physiological parameter of an individual or an environmental parameter captured by the at least one wearable device in a vicinity of the individual; determining whether a triggering event has occurred based on the first measurement, the triggering event associated with generating tagging information based on the first measurement using a machine learning model adapted to run on the at least one processor; and in response to determining that the triggering event has occurred, editing a selected clip from a multimedia stream currently being captured by the image sensor to include the tagging information generated based on the first measurement at a corresponding timestamp.

19 Claims, 4 Drawing Sheets

MULTIMODAL MULTIMEDIA PROCESSING FOR WEARABLE DEVICE

TECHNICAL FIELD

This application relates to wearable computing, and in particular, multimodal multimedia processing for wearable devices.

BACKGROUND

Modern technologies have provided users with wearable computing devices configured to sense and track a user's physiological parameters or environmental parameters surrounding the user. Based upon such parameters, the wearable computing devices may perform health-related analyses and recommendations to apply such information towards improved health of the user.

The development of wearable technology and machine learning technology such as the large language models (LLMs) can greatly expand the boundaries of wearable devices.

SUMMARY

Disclosed herein are implementations of methods, apparatuses, and systems for multimodal multimedia processing for wearable devices.

In one aspect, a method of multimodal multimedia processing for at least one wearable device, which comprises an image sensor and at least one processor, is disclosed. The method includes in response to the image sensor of the at least one wearable device being turned on, obtaining, by the at least one wearable device, a first measurement of at least one of a physiological parameter of an individual or an environmental parameter captured by the at least one wearable device in a vicinity of the individual; determining, by the at least one processor of the at least one wearable device, whether a triggering event has occurred based on the first measurement, the triggering event associated with generating tagging information based on the first measurement for the image sensor of the at least one wearable device using a machine learning model adapted to run on the at least one processor of the at least one wearable device; and in response to determining that the triggering event has occurred, editing, by the at least one processor of the at least one wearable device, a selected clip from a multimedia stream currently being captured by the image sensor of the at least one wearable device to include the tagging information generated based on the first measurement at a corresponding timestamp.

In another aspect, a wearable device for multimodal multimedia processing is disclosed. The wearable device includes an image sensor, a non-transitory memory; and at least one processor configured to execute instructions stored in the non-transitory memory to: in response to the image sensor of the wearable device being turned on, obtain a first measurement of at least one of a physiological parameter of an individual or an environmental parameter captured by the wearable device in a vicinity of the individual; determine whether a triggering event has occurred based on the first measurement, the triggering event associated with generating tagging information based on the first measurement for the image sensor using a machine learning model adapted to run on the at least one processor; and in response to determining that the triggering event has occurred, edit a selected clip from a multimedia stream currently being captured by the image sensor to include the tagging information generated based on the first measurement at a corresponding timestamp.

In another aspect, a non-transitory computer-readable storage medium configured to store computer programs for multimodal multimedia processing using at least one wearable device is disclosed. The computer programs include instructions executable by at least one processor to perform the method described above.

DETAILED DESCRIPTION

Figure 1:
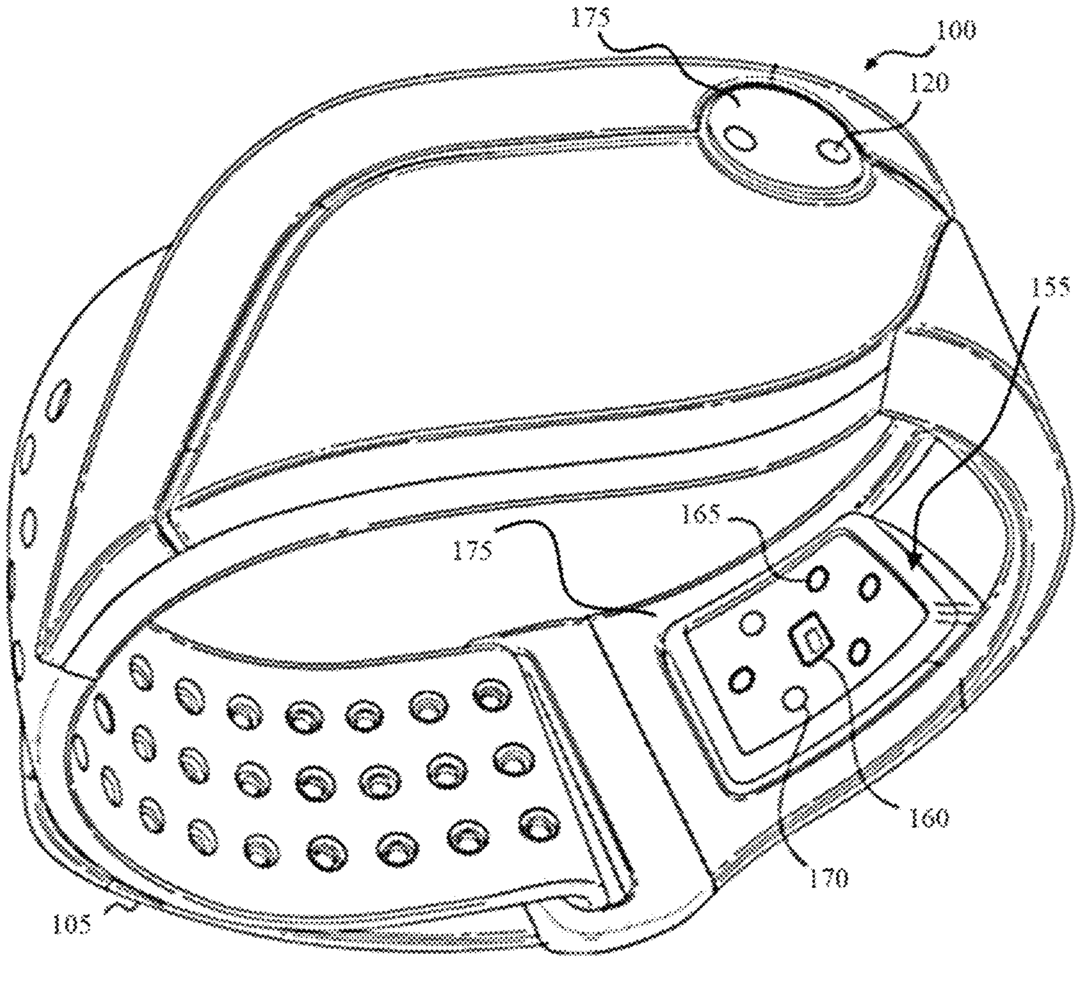
FIG. 1 is a perspective view of an example wearable device in accordance with the present teachings.

The development of wearable technology and machine learning technology such as the large language models (LLMs) have enabled the boundaries of wearable devices to greatly expand. Modern technologies have provided users with wearable computing devices configured to sense and track a user's physiological parameters or environmental parameters in the vicinity of the user. With these developments, when viewed from the perspective of product forms, wearable devices with multiple sensing functions have been replacing the more simple wearable devices with singular functions. From the perspective of production functionalities, multimodal wearable devices have become not just fitness or sports trackers, and can take on complex tasks such as being able to automatically generate advanced sports health management and guidance based on multimodal data input, as well as recording and extracting highlighted moments during daily lives, or generating personalized multimedia lifelog entries in a rich media diary. From the perspective of product experiences, with the addition of machine learning models such as the LLMs, wearable devices and systems are evolving from software tools that take commands to become "living beings" that can be used to automatically generate semantics, tasks and interactions with people.

Implementations of this disclosure aim to build a collaboration system based on image sensors of the wearable devices and other wearable sensors or devices (such as smart watches, bracelets, rings, bands, head mounted devices, headphones, earbuds, sports modules or particles, AR/VR glasses, portable sensors integrated into clothing or accessories etc.), which can use machine learning models such as the LLMs to analyze multimodal data inputs (real-time or non-real-time) from the wearable devices to capture moments in real-time video clips, to discover abnormal physiological parameters in the daily life or mutations from life homeostasis that can trigger further actions such as alerts, and to find life events worth recording (such as personal record breaking moments in sports, completion of challenging actions, etc.), among other things. These can be used to generate tagging information (e.g., labels) for the video clips being captured, to help capture the most important clips from the multimedia stream captured by the image sensor, to trigger visual recognition in real time, and to determine tasks such as alerts or alarms, or to be used for post-event video analysis, editing, or to generate collage of video highlights, etc.

According to implementations of this disclosure, a method for multimodal multimedia processing using at least one wearable device is provided. The at least one wearable device can include, for example, an image sensor, such as a wearable camera, and other sensors that can take measurements such as physiological parameters (e.g., heart rate, heart rate variability (HRV), blood pressure, blood glucose level, respiration rate, body temperature or the like) or environmental parameters (e.g., altitude, GPS location, ambient temperature, ambient humidity, ambient noise index, an environmental pollution index, or the like). The image sensor and the other sensors can be located in the same device or different devices.

In some implementations, all the above-mentioned sensors are provided on the same wearable device. In some other implementations, a first wearable device includes an image sensor, and a second wearable device includes one or more physiological sensors and/or one or more environmental sensors. The first wearable device and the second wearable device may be worn on a same or different body parts. For instance, the first wearable device may be a head mounted device, and the second wearable device may be a wrist wearable device. In some other implementations, the first wearable device further includes one or more physiological sensors and/or environmental sensors, and the second wearable device includes one or more additional physiological sensors and/or environmental sensors. In this case, the physiological parameters and/or environmental parameters may be obtained from the first wearable device and the second device. In some implementations, at least a part of the first or second measurement (e.g., temperature, humidity or the environmental pollution index) can be obtained from a communication network such as the Internet.

According to implementations of this disclosure, when the image sensor is turned on, a measurement of at least one of a physiological parameter or an environmental parameter can be obtained to determine whether a triggering event has occurred. If the triggering event is determined to have occurred, tagging information can be generated for a selected video clip, such as the one that is currently being captured by the image sensor. In some instances, multiple parameters such as a combination of the one or more physiological parameters and one or more environmental parameters can also be used to determine the triggering event or the tagging information. The tagging information can be generated based on the measurement using a first machine learning model adapted to run on a processor of the at least one wearable device. The selected video clip can be edited to include the tagging information at a corresponding timestamp. The tagging information for the video clip can include, for example, at least one of the measurement used for determining the triggering event, information extracted from the multimedia stream generated by the image sensor, the triggering event, or the corresponding timestamp. The selected video clip and related tagging information can be saved or uploaded for further editing or analysis. In some instances, the selected clip that includes the tagging information can be sent to a server and analyzed with other tagged clips to update a personalized multimedia lifelog.

According to implementations of this disclosure, the first machine learning model used to generate the tagging information can include, for example, a support vector machine (SVM) model, a deep learning model, or a generative AI model. In some implementations, the first machine learning model includes a first large language model (LLM) customized for an individual and adapted to run on the processor of the at least one wearable device worn by the individual (the terms individual and user are used interchangeably). The first machine learning model can be a lightweighted model and suitable for running on the wearable device with limited computing capability. Optionally, in addition to the first machine learning model customized for the individual and adapted to run on the at least one wearable device, a second machine learning model and an expert knowledge base on the cloud server can also be provided to improve and expand on the tagging information generated by the first machine learning model, or to generate additional tagging information. The second machine learning model may have more computing capability and be implemented with a second generative AI model or a second LLM. For example, the second LLM and the expert knowledge base can help generate personalized multimedia lifelog over time. Also for example, the selected video clips with the tagging information can be analyzed in real-time or non-real-time to obtain semantic content. With the accumulated personalized multimedia lifelog, the tagging information such as the measurements of the physiological and/or environmental parameters, as well as semantic content obtained from analysis of the selected video clips, life guidance and alerts can be provided to help improve the individual's life in real-time or non-real-time. Further details of multimodal multimedia processing for wearable devices are described herein with initial reference to an example device in which it can be implemented.

FIG. 1 depicts a perspective view of an example device 100 according to some implementations of this disclosure. The device 100 may be a wearable device worn by an individual (also referred to herein as a user) to at least one of sense, collect, monitor, analyze, or display information pertaining to one or more of a physiological parameter of the individual or an environmental parameter captured by the device 100 in a vicinity of the individual. The device 100 can include, for example, a head mounted device, a wristband, a ring, a strap (e.g., a chest strap), headphones or a wristwatch. Although depicted in FIG. 1 as a wristwatch, the device 100 can include the wearable device configured for positioning at a user's wrist, arm, finger, chest, another extremity of the user, or some other area of the user's body, such as a wearable camera. For example, the device 100 can be a wearable camera having an image sensor with capabilities such as high-speed shooting performance, low-light or dark shooting performance, high image quality, or anti-shake performance, among other things. In addition, the wearable camera can be equipped with other sensors as discussed below (e.g., a PPG sensor to detect heart rate, altitude sensor, a temperature sensor, a humidity sensor, etc.).

The device 100 may include sensors and processing tools for detecting, collecting, processing, or displaying one or more physiological parameters of the individual and/or other information that may or may not be related to health, wellness, exercise, sleep, or physical training sessions (e.g., characteristic information, education information, etc.). The physiological parameter can include at least one of: heart rate, heart rate variability (HRV), blood pressure, blood glucose level, respiration rate, body temperature, sleep state, sleep phase, mental state, stress state, or other physiological information that can be measured for the individual.

The device 100 may also include sensors and processing tools for detecting, collecting, processing, or displaying one or more environmental parameters captured by the device 100 in a vicinity of the individual.

The environmental parameter can include, for example, positioning information, location, altitude, temperature, humidity, environmental light, weather, environmental pollution index such as PM2.5 particulate matter content or CO2/CO content, which can be captured by, for example, one or more environmental sensors of the device 100. The environmental parameter can also include motion data such as motion tracks from a GPS sensor and/or a motion sensor (e.g., one or more of an accelerometer, gyroscope, magnetometer, etc.) or a barometer to record additional measurement data such as altitude. The environmental parameter can include at least one of: altitude, GPS location, ambient temperature, ambient humidity, ambient light, ambient noise index, an environmental pollution index, or other environmental parameter in the vicinity of the individual that can be captured by the at least one wearable device.

The device 100 may further include one or more communication modules. One or more communication modules may also communicate with other devices such as a personal device of the user (such as a handheld device, a smart phone, a tablet, a laptop computer, a desktop computer, or the like) or a server (such as a cloud-based server). The communications can be transmitted wirelessly (e.g., via Bluetooth, RF signal, Wi-Fi signal, near field communications, etc.) or through one or more electrical connections embedded in the band 105. Any analog information collected or analyzed can be translated to digital information for reducing the size of information transfers between modules.

As shown in FIG. 1, the device 100 can include a sensor unit 155 including at least one of, but not limited to, an image sensor, such as a camera (not shown), one or more physiological sensors such as a PPG sensor including one or more optical detectors 160 and one or more light sources 165, one or more contact pressure/tonometry sensors 170, or one or more motion sensors including at least one of the one or more gyroscopes or accelerometers 175. These sensors are only illustrative of the possibilities, however, and additional or alternative sensors such as one or more acoustic sensors, electromagnetic sensors, ECG electrodes 120, bio impedance sensors, or galvanic skin response, or a combination thereof may be included. Though not depicted in the view shown in FIG. 1, the device 100 may also include one or more such sensors and components on its inside surface (i.e., the surface in contact with the user's tissue or targeted area). It should be understood that the device 100 can be implemented with a different configuration of the sensor unit 155 from what is depicted in FIG. 1 or the examples of the disclosure.

The location of the sensor unit 155 or the location of one or more sensor components of the sensor unit 155 with respect to the user's tissue may be customized to account for differences in body type across a group of users or placement in different locations on a user.

The displacement values and additional data collected from the sensor unit 155 may assist a non-transitory computer readable medium or processor in isolating various physiological conditions (e.g., heart beats, respiration, etc.). The processor may receive data from the sensor unit 155. The processor may dynamically filter the data. The process may analyze the data without regard to a position of the device relative to the user or a position of the user. The processor may filter unwanted signals and isolate only desired signals. For example, the processor may learn which signals are of interest and the process may analyze only those signals of interest. The processor may be in communication with or include a non-transitory computer-readable medium.

The sensor unit 155 can be configured to continuously collect data from a user. However, certain techniques can be employed to reduce power consumption and conserve battery life of the device 100. For example, while the PPG sensor can be used to continuously monitor blood flow of the user, the ECG electrodes 120 can be used periodically or intermittently to collect potentially more accurate blood flow information which can be used to supplement or calibrate the PPG measurements collected and analyzed by the processor.

For example, when the data from one or more accelerometers or gyroscopic components of the device 100 indicates that a user is still or at rest, one or more sensors of the device 100, such as the PPG sensor, which consumes more power than the one or more accelerometers or gyroscopic components, may be turned off to conserve power consumption. However, when the data from the one or more accelerometers or gyroscopic components of the device 100 indicates that the user is exercising, the one or more sensors of the device 100, such as the PPG sensor, may be turned on to measure the heart rate and/or other physiological parameters of the user. In another example, when the data from one or more accelerometers or gyroscopic components of the device 100 indicates that a user is sleeping and the sleep analysis function is turned on, the one or more sensors, such as the PPG sensor, may still need to be turned on even though the movement of the user from the one or more accelerometers or gyroscopic components of the device 100 is minimal during sleep.

The device 100 may also include an input and/or an output unit, such as a display unit (not shown), sound unit, tactile unit or the like, for communicating information to the user (i.e., the wearer of the device 100). The display unit may be configured to display the images or videos captured by the sensors such as the image sensor, notifications or alerts. The display unit may be an LED indicator including a plurality of LEDs, each a different color. The LED indicator can be configured to illuminate in different colors depending on the information being conveyed. For example, where the device 100 is configured to monitor the user's heart rate, the display unit may illuminate light of a first color when the user's heart rate is in a first numerical range, illuminate light of a second color when the user's heart rate is in a second numerical range, and illuminate light of a third color when the user's heart rate is in a third numerical range. In this manner, a user may be able to detect his or her approximate heart rate at a glance, even when numerical heart rate information is not displayed at the display unit, and/or the user only sees the device 100 through the user's peripheral vision (e.g., while exercising).

The display unit may include a display screen for displaying images, characters, graphs, waveforms, or a combination thereof to the user or a medical professional. The display unit may further include one or more hard or soft buttons or switches configured to accept input by the user. Similarly, the display screen may be a touch screen configured to accept input by the user. The display unit may also switch or be toggled between displaying information.

The physiological or environmental information discussed above may be graphically displayed or represented on a display (not shown) of the device 100. The graphical display may be provided as an output. The output may include physiological or environmental information of a user. For example, the information collected may be categorized and then graphically represented as one or more outputs. The output may include alert, guidance or suggestion to the user. The output may also include education information pertaining to topics of interest for the user.

Figure 2:
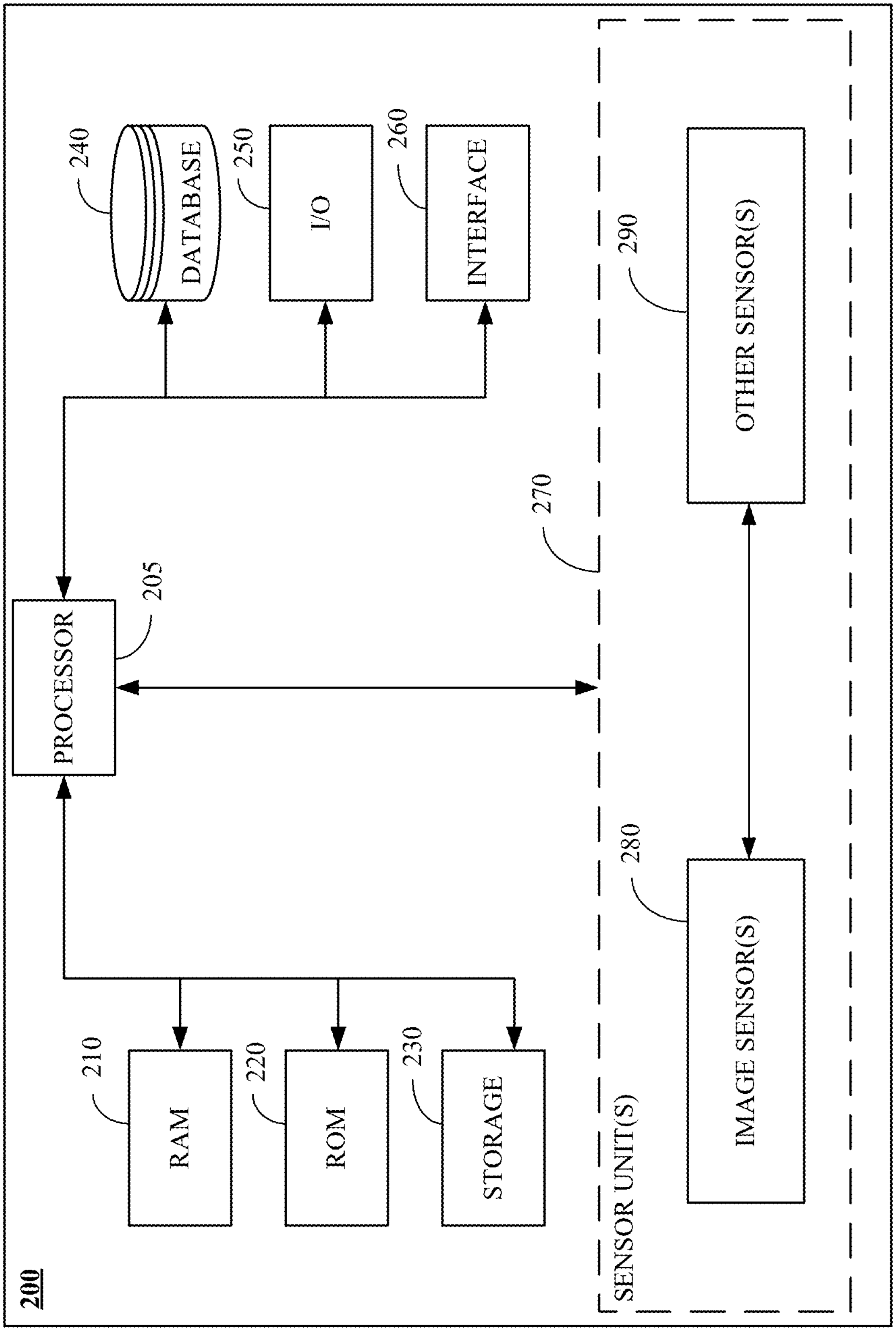
FIG. 2 is a block diagram of an example of a computing device that may be used with or incorporated into a wearable device in accordance with the present teachings.

FIG. 2 depicts an example of a computing device 200 that may be used with or incorporated into a wearable device. The computing device 200 is representative of the type of computing device that may be present in or used in conjunction with at least some aspects of the device 100, or any other device comprising electronic circuitry. For example, the computing device 200 may be used in conjunction with any one or more of transmitting signals to and from the one or more optical sensors or acoustical sensors, sensing or detecting signals received by one or more sensors of the device 100, processing received signals from one or more components or modules of the device 100 or a secondary device, and storing, transmitting, or displaying information. The computing device 200 may be or may be included within the device 100. The computing device 200 may be a mobile terminal or remote device that is in communication with the device 100. The computing device 200, the device 100, or both may be in communication with a server (e.g., a cloud-based server). For example, the computing device 200 may be a separate device (e.g., a mobile terminal device) from the device 100, and both the computing device 200 and the device 100 may be in direct communication with the server. Alternatively, the computing device 200 may be in direct communication with the server and the device 100 may be in communication with the server via the computing device 200. It should also be noted that the computing device 200 is illustrative only and does not exclude the possibility of another process- or controller-based system being used in or with any of the aforementioned aspects of the device 100.

In one aspect, the computing device 200 may include one or more hardware and/or software components configured to execute software programs, such as software for obtaining, storing, processing, and analyzing signals, data, or both. For example, the computing device 200 may include one or more hardware components such as, for example, a processor 205, a random-access memory (RAM) 210, a read-only memory (ROM) 220, a storage 230, a database 240, one or more input/output (I/O) modules 250, an interface 260, and one or more sensors 270.

Alternatively, and/or additionally, the computing device 200 may include one or more software components such as, for example, a computer-readable medium including computer-executable instructions for performing techniques or implement functions of tools consistent with certain disclosed embodiments. It is contemplated that one or more of the hardware components listed above may be implemented using software. For example, the storage 230 may include a software partition associated with one or more other hardware components of the computing device 200. The computing device 200 may include additional, fewer, and/or different components than those listed above. It is understood that the components listed above are illustrative only and not intended to be limiting or exclude suitable alternatives or additional components.

The processor 205 may include one or more processors, each configured to execute instructions and process data to perform one or more functions associated with the computing device 200. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 2, the processor 205 may be communicatively coupled to the RAM 210, the ROM 220, the storage 230, the database 240, the I/O module 250, the interface 260, and the one or more sensors 270. The processor 205 may be configured to execute sequences of computer program instructions to perform various processes, which will be described in detail below. The computer program instructions may be loaded into the RAM 210 for execution by the processor 205.

The RAM 210 and the ROM 220 may each include one or more devices for storing information associated with an operation of the computing device 200 and/or the processor 205.

For example, the ROM 220, may include a memory device configured to access and store information associated with the computing device 200, including information for identifying, initializing, and monitoring the operation of one or more components and subsystems of the computing device 200. The RAM 210 may include a memory device for storing data associated with one or more operations of the processor 205. For example, the ROM 220 may load instructions into the RAM 210 for execution by the processor 205.

The storage 230 may include any type of storage device configured to store information that the processor 205 may use to perform processes consistent with the disclosed embodiments.

The database 240 may include one or more software and/or hardware components that cooperate to store, organize, filter, and/or arrange data used by the computing device 200 and/or the processor 205. For example, the database 240 may include user profile information, historical activity and user-specific information, physiological parameter information, predetermined menu/display options, and other user preferences. Alternatively, the database 240 may store additional and/or different information. For example, the database 240 may include information to establish a machine learning model such as a large language model (LLM) that can receive inputs from the I/O module 250 or sensor(s) 270.

The I/O module 250 may include one or more components configured to communicate information with a user associated with the computing device 200. For example, the I/O module 250 may include one or more buttons, switches, or touchscreens to allow a user to input parameters associated with the computing device 200. The I/O module 250 may also include a display including a graphical user interface (GUI) and/or one or more light sources for outputting information to the user. The I/O module 250 may also include one or more communication channels for connecting the computing device 200 to one or more secondary or peripheral devices such as, for example, a desktop computer, a laptop, a tablet, a smart phone, a flash drive, or a printer, to allow a user to input data to or output data from the computing device 200.

The interface 260 may include one or more components configured to transmit and receive data via a communication network, such as the internet, a local area network, a workstation peer-to-peer network, a direct link network, a wireless network, or any other suitable communication channel. For example, the interface 260 may include one or more modulators, demodulators, multiplexers, demultiplexers, network communication devices, wireless devices, antennas, modems, and any other type of device configured to enable data communication via a communication network.

The computing device 200 may further include the one or more sensors 270. In one embodiment, the one or more sensors 270 may include one or more of an image sensor 280, and/or other sensors 290 such as an accelerometer, an optical sensor, an acoustical sensor, an ambient light sensor, a pressure sensor, a contact sensor, an electromagnet sensor, an ECG electrode, and/or a bio impedance sensor, etc. It should be noted that these sensors are only illustrative of a few possibilities and the one or more sensors 270 may include alternative or additional sensors suitable for use in the device 100. It should also be noted that although one or more sensors are described collectively as the one or more sensors 270, any one or more sensors or sensor units within the device 100 may operate independently of any one or more other sensors. Moreover, in addition to collecting, transmitting, and receiving signals or information to and from the one or more sensors 270 at the processor 205, any of the one or more sensor units of the one or more sensors 270 may be configured to collect, transmit, or receive signals or information to and from other components or modules of the computing device 200, including but not limited to the database 240, the I/O module 250, or the interface 260.

As described above with respect to FIG. 1, the accelerometer can be used to detect large-scale motions of a subject indicative of physical activity (e.g., steps, running, walking swimming, etc.) The same accelerometer can be used to determine the onset of a sleep period through the detection of a lack of motion. The acoustical sensor can be used to detect and monitor heart rate. However, in case the sensitivity of the acoustical sensor that detects heart rate is not enough to detect relatively slow heart rate during sleeping, in one embodiment, upon determining that the subject is engaged in sleep, the sensitivity of the acoustical sensor can be reconfigured to detect a significantly lower heart rate. Alternatively, one or more acoustical sensors can be dedicated to, and configured for, detecting relatively slow heart rate during sleeping while one or more other acoustical sensors are used to detect regular heart rate during physical activity.

Figure 3:
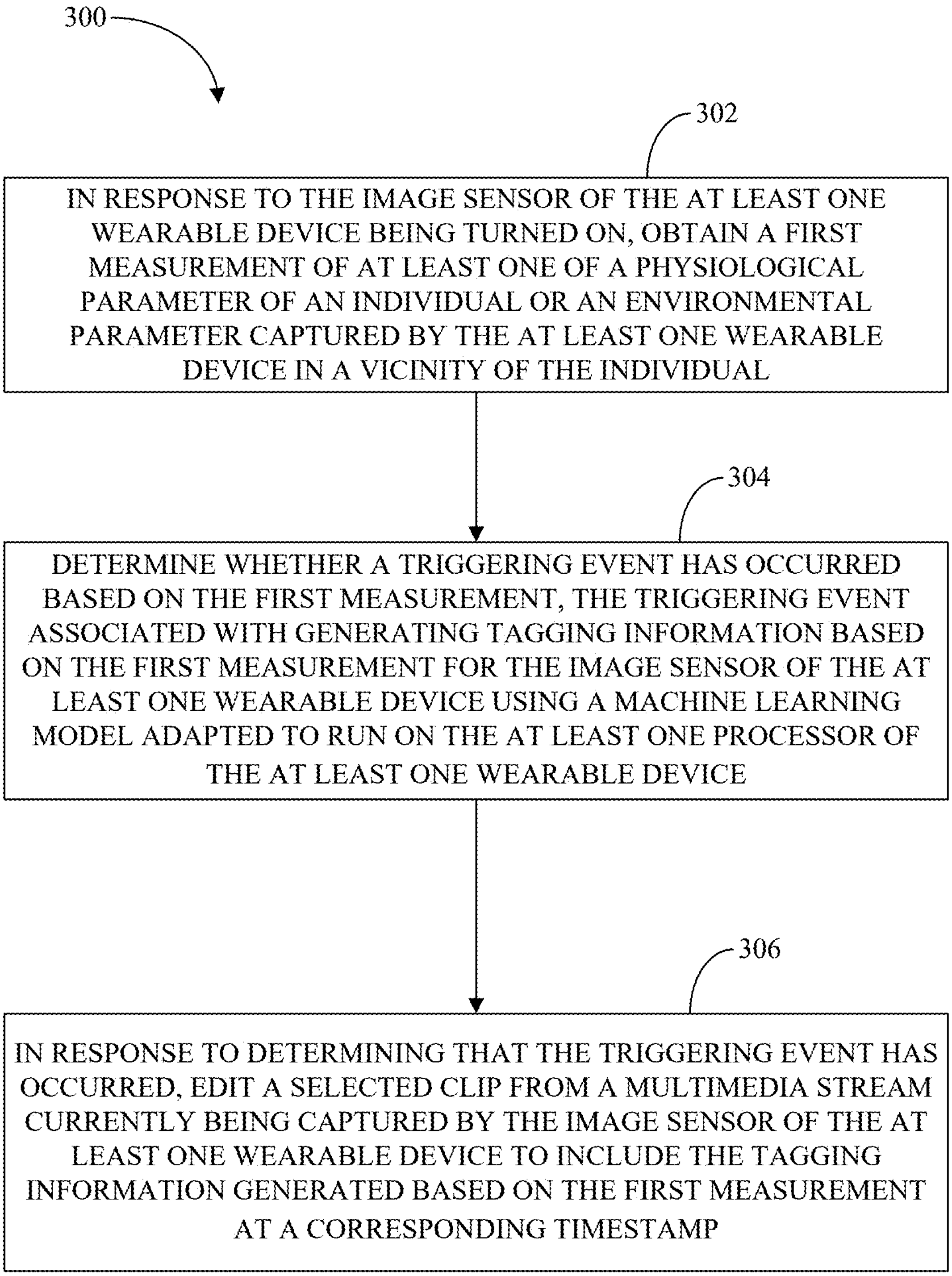
FIG. 3 is a flow diagram of an example process of multimodal multimedia processing using at least one wearable device according to some implementations of this disclosure.

FIG. 3 is a flowchart of an example process 300 of multimodal multimedia processing using at least one wearable device according to some implementations of this disclosure. It should be noted that the flowchart and the process 300 may be used interchangeably herein. The process 300 can be implemented as software and/or hardware modules in, for example, the device 100 of FIG. 1 or the computing device 200 of FIG. 2. In an example, the process 300 can be implemented as software modules stored in the storage 230 as instructions and/or data executable by the processor 205 of an apparatus, such as the computing device 200 in FIG. 2. Some or all of the operations of the process 300 can be implemented by the processor 205 of FIG. 2. In another example, the process 300 can be implemented in hardware as a specialized chip storing instructions executable by the specialized chip. In some implementations, the process 300 can be implemented using more than one wearable device, such as the device 100 or the computing device 200 (which can be used to implement a portion of the process 300) and another wearable device (which can be used to implement the remaining portion of the process 300).

A person skilled in the art will note that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

Similarly, all or a portion of the aspects of the disclosure described herein can be implemented by the device 100 (e.g., by the processor 205 when the computing device 200 is incorporated into the device 100), by a server in communication with the device 100 and/or the computing device 200, or both. Additionally, all or a portion of the aspects of the disclosure described herein (e.g., steps, procedures, processes, etc.) may be performed by the device 100, or the computing device 200, or a secondary companion device (e.g., a mobile terminal, a client device, other remote device, another wearable device etc.). For example, a portion of the steps or procedures described herein may be performed by the aforementioned server while another portion of the steps or procedures may be performed by the secondary companion device.

The at least one wearable device that implements the process 300 includes an image sensor and at least one processor.

At an operation 302, in response to the image sensor of the at least one wearable device being turned on, a first measurement, which includes at least one of a physiological parameter of an individual or an environmental parameter captured by the at least one wearable device in a vicinity of the individual, is obtained.

In some implementations, when the image sensor is turned on, the image sensor may be configured to capture pictures and/or videos, and the first measurement can be obtained in response to the image sensor being turned on.

The first measurement can be obtained by the at least one wearable device through various means. The first measurement can be obtained by the image sensor itself and/or another sensor. In some implementations, the at least one wearable device comprises the image sensor and at least one second sensor, wherein the at least one second sensor performs multimodal cooperation with the image sensor. For example, the first measurement can be obtained by the at least one second sensor of a same device as the image sensor, or by the at least one second sensor of a different device from the image sensor, by the image sensor itself, or by the image sensor and the at least one second sensor. Multimodal cooperation among different devices, or among sensors within the same device, allows for a comprehensive understanding, monitoring and guidance of the individual's life events and interests, without requiring an extensive collection of specialized devices. As will be discussed below, multimodal cooperation can include, for example, having different sensors engage in different types of measurements and using data obtained from the different sensors for detecting triggering events and/or editing selected video clips taken by the image sensor to include tagging information based on the measurements, in a collaborative fashion. For example, the first measurement can be obtained when the at least one wearable device or another device (e.g., a computing device or a server) in communication with the at least one wearable device receives an indication that the image sensor of the at least one wearable device has been turned on, or when the at least one wearable device or the other device receives raw or processed image or video data from the image sensor, etc. The image sensor and the at least one second sensor can communicate with each other directly (e.g., via hardwire, Bluetooth, RF, Wi-Fi signal, near field communications, etc.) or indirectly (e.g., via at least one wearable device or another device).

The physiological parameter can include at least one of: heart rate, heart rate variability (HRV), blood pressure, blood glucose level, respiration rate, body temperature, or other physiological information that can be measured for the individual. The environmental parameter can include at least one of: altitude, GPS location, ambient temperature, ambient humidity, ambient noise index, an environmental pollution index, or other environmental parameter that can be captured by the at least one wearable device in the vicinity of the individual.

At an operation 304, whether a triggering event has occurred can be determined based on the first measurement, wherein the triggering event is associated with generating tagging information based on the first measurement for the image sensor of the at least one wearable device using a machine learning model adapted to run on the at least one processor of the at least one wearable device.

In some implementations, the triggering event can be associated with the first measurement, such as a detection of soaring heartrate or short breath, or a combination of several measurements of different parameters or modalities. The triggering event can also be an item recognized in the video or photo taken by the image sensor, such as a dish during meal. Whether the triggering event has occurred can be determined by various ways, such as comparing the first measurement with one or more thresholds, determining the trend of the first measurement in view of previous measurements, determining the difference of the first measurement from at least one previous measurement and comparing the difference to a threshold, using a model built from data analysis of previous measurements and/or big data, or preset by the individual etc. Different triggering events can be determined for different scenarios, as will be discussed in the examples below.

In some implementations, the at least one wearable device includes the image sensor and at least one second sensor in a multimodal cooperation with the image sensor, and the operation 304 further includes obtaining, by at least a part of the at least one second sensor, a second measurement of at least one of another physiological parameter of the individual or another environmental parameter captured by the second sensor in the vicinity of the individual; and determining, by the at least one processor of the at least one wearable device, whether the triggering event has occurred based on the first measurement and the second measurement.

For example, the first measurement can include a measurement of a physiological parameter such as heart rate, heart rate variability (HRV), blood pressure, blood glucose level, respiration rate, body temperature, or other physiological information. The first measurement can be captured by the image sensor or another sensor. The second measurement can include a measurement of an environmental parameter captured by another sensor, such as altitude, GPS location, ambient temperature, ambient humidity, ambient noise index, an environmental pollution index, or other environmental parameter. The second measurement can be obtained by the same sensor or a different sensor as the first measurement. In other examples, the first measurement can include a measurement of a physiological parameter or an environment parameter, and the second measurement can include a measurement of another physiological parameter or another environment parameter, and both the first and second measurements are used for determining whether the triggering event has occurred.

As an illustrative use case example, the process 300 can be implemented in a paragliding scenario. On an ideal sunny day for this adventure, a paragliding enthusiast and a few like-minded friends went to Pokhara, Nepal, a paragliding mecca. The paragliding enthusiast wore the at least one wearable device and climbed to the top of a mountain, below which is a river valley at an altitude of 900 meters (2700 feet), where the warm weather, stable and moderate updrafts ensure a particularly good gliding experience. Standing on top of the mountain, before gliding, an image sensor (e.g., a camera) of the at least one wearable device was turned on to record the entire movement process at a certain frame rate (e.g., 60 frames per second). In response to the image sensor being turned on, a first measurement of at least one of a physiological parameter or an environmental parameter of the paragliding enthusiast can be obtained by the at least one wearable device. The physiological parameter can include, for example, the heart rate, respiration rate, HRV, or other parameters sensed during paragliding that can be measured by the at least one wearable device. In an example, the at least one wearable device can include a wearable camera (or a headset or helmet equipped with the camera), as well as sensors that can measure the heartrate, respiration rate, HRV, etc. In another example, the at least one wearable device can include a wristwatch with sensors that can measure the heartrate, respiration rate, HRV, etc. The wearable camera can be integrated with the wristwatch, or be a separate device worn by the paragliding enthusiast. The environmental parameter can include, for example, temperature, humidity, environmental pollution index such as PM2.5 particulate matter content or $CO_2$/CO content, which can be captured by, for example, environmental sensor(s) of the camera, such as the wearable camera mentioned above. The environmental parameter can also include motion data such as motion tracks from a GPS sensor and/or a motion sensor (e.g., accelerometer, gyroscope, magnetometer, etc.) to help recording gliding action and tracking gliding movement, or a barometer to record additional measurement data such as gliding altitude. The first measurement can be obtained while the camera records the movement process, which can be obtained continuously, periodically, irregularly, based on personal or system preferences, etc.

In the paragliding example, the paragliding enthusiast took off from the top of the mountain, glided along the slope to the bottom of the valley, and did a variety of challenging actions in the air, such as somersaults, loops, helicopters, grounding spirals, swings, etc., while screaming, cheering, or holding breath from time to time when completing each challenging action in the air, with soaring heart rates. Parameters that can be sensed by the at least one wearable device worn by the paragliding enthusiast associated with these actions can include physiological data and/or various environmental data as discussed above, which can be used to determine triggering event(s) and tag the video being recorded by the camera at the time of the action. Determining the triggering event for video tagging can be based on, for example, a soaring heart rate above a certain threshold, a loud scream above a certain sound level, or a detection of certain movement (e.g., somersault) and so on. For example, the tagging information can be added to the video when it is determined that the paragliding enthusiast performed a somersault, or loudly cheered during paragliding with soaring heart rates.

In some implementations, such as when the at least one wearable device is connected to a communication network (e.g., the Internet), at least a part of the first or second measurement can be obtained from the communication network. For example, the first or second measurement includes at least one of local temperature, humidity or environmental pollution index such as PM2.5 particulate matter content obtained from the communication network (e.g., the Internet), based on the location of the at least one wearable device.

Back to the operation 304, in some implementations, the machine learning model adapted to run on the at least one processor of the at least one wearable device comprises a first large language model (LLM) customized for the individual and adapted to run on the at least one processor of the at least one wearable device. In the paragliding example, the machine learning model adapted to run on the at least one wearable device, such as the first LLM customized for the individual, may be able to detect that the paragliding enthusiast had performed similar challenging actions (such as somersault) in the past, so instructions can be generated to extract the current video clip for analysis and comparison with video clips where somersaults were previously performed by the paragliding enthusiast. Instead of relying on machine learning models at a larger device such as a mobile terminal, a computer, a cloud server etc., the machine learning model such as the first LLM can be adapted to run on the at least one processor of the at least one wearable device and customized for the individual such that the tagging and decision making can be tailored to the individual without special training.

In some implementations, in addition to the first LLM customized for the individual and adapted to run on the at least one processor of the at least one wearable device, a second LLM and an expert knowledge base, which interacts with the second LLM, can also be used. The expert knowledge base can be used, for example, to provide reliable prompts to the second LLM to reduce hallucinations of the second LLM. The interactions between the expert knowledge base and the second LLM can include, for example, communications in either direction or bilateral, which can include collaborations. The second LLM and the expert knowledge base can be at a remote location such as a server, for example. As will be discussed below, more complex tasks, such as updating a personalized multimedia lifelog, complex semantic parsing or task generation from the personalized multimedia lifelog over time, and high-level life coaching can be performed using the second LLM and the expert knowledge base. The expert knowledge base can be, for example, a domain knowledge database.

In some implementations, at the operation 304, an instruction to direct the image sensor of the at least one wearable device to switch to perform a task can be generated based on the first measurement, wherein the task is generated using at least one of the first LLM or the second LLM.

In some implementations, the task to be performed by the image sensor of the at least one wearable device comprises at least one of: updating a frame rate of the multimedia stream currently being captured, or taking a high-resolution still photo. For example, when a user is skateboarding while wearing the at least one wearable device, the image sensor is turned to record at a regular frame rate. Upon detecting a bouncing and flipping action, which can be based on the first measurement, or based on the first measurement and one or more photos or videos captured by the image sensor, or based on the first measurement and the second measurement as discussed above, the first LLM on the at least wearable device can be used to automatically generate an instruction to direct the image sensor to switch to record at a frame rate higher than the regular frame rate. For example, the higher frame rate can be switched to 120 fps upon detecting the bouncing and flipping action. After the bouncing and flipping action ends, the first LLM on the at least wearable device can be used to instruct the image sensor to switch back to the regular frame rate. In another example, such as when the triggering event is related to the user dining in a restaurant, the first LLM can be used to automatically notify the image sensor, e.g., the camera, to take high-resolution pictures of items (such as food and/or drinks) served to the user, which can be automatically analyzed and saved. The instruction to direct the image sensor of the at least one wearable device to switch to perform the task can also be generated using the second LLM, which can be located on the server.

At an operation 306, in response to determining that the triggering event has occurred, a selected clip from a multimedia stream currently being captured by the image sensor of the at least one wearable device is edited to include the tagging information generated based on the first measurement at a corresponding timestamp. However, if the evaluation at the operation 304 determines that a triggering event has not occurred based on the first measurement, the process 300 can return to the operation 302 to obtain the next measurement. The clip can be selected from the multimedia stream based on, for example, the corresponding timestamp of the first measurement associated with the triggering event, which can also be included as part of the tagging information.

In the paragliding example, in response to determining that the triggering event has occurred, such as when the paragliding enthusiast performed a somersault, or when at least one parameter of the first measurement (e.g., heart rate) exceeds a corresponding threshold, a clip can be selected from a multimedia stream currently being captured by the image sensor (e.g., camera) of the at least one wearable device. The clip can be selected from the multimedia stream based on the corresponding timestamp of the first measurement. The selected clip is edited to include the tagging information regarding the somersault or information related to the heart rate, which can be generated based on the first measurement at the corresponding timestamp of the action.

In some implementations, the tagging information comprises the first measurement, information extracted from the multimedia stream, and the corresponding timestamp. The corresponding timestamp can be, for example, the timestamp associated with the first measurement, or the timestamp of the triggering event that is determined to have occurred.

In some implementations, the selected clip is analyzed with other tagged clips to determine a personalized multimedia lifelog entry. For example, the personalized multimedia lifelog entry can include information about a skateboarding event such as weather, location, as well as selected video clips such as the ones tagged with "bouncing and flipping" as highlights. The analysis can also include comparing the selected clip(s) with tagged clips from previously stored events and highlighting the one(s) that meets certain criteria (such as "personal best") in the personalized multimedia lifelog entry.

In some implementations, the operation 306 further includes sending the selected clip to a server, wherein the selected clip including the tagging information is analyzed to update the personalized multimedia lifelog entry. The personalized multimedia lifelog entry can be updated, for example, using the second LLM and the expert knowledge base interacting with the second LLM. In the paragliding example, the personalized multimedia lifelog entry can include the selected video clips with the tagging information to form a collection of personal "highlighted paragliding videos," which can include the selected clips of the operation 306 and the tagging information. In another example, when the user is dining at a restaurant, the personalized multimedia lifelog entry can include a collection of selected video clips of the dining experience, the tagging information, and the meal summary.

In some implementations, the personalized multimedia lifelog entry can be generated by the second LLM based on the selected clip and the tagging information, which are analyzed by the second LLM, as well as based on the previously selected clips and the expert knowledge base, which can be used to generate prompts for the second LLM to reduce hallucination, as previously discussed.

Back to the paragliding example, twenty minutes later, the paragliding enthusiast landed safely in the river valley. The video clips taken by the camera of the at least one wearable device can be analyzed, selected and edited to include the tagging information, which were then uploaded and saved to the sever such as a cloud server. The selected clips can be arranged in order (e.g., chronologically) to form a personal record of "highlighted paragliding videos" (also referred to as "highlighting events"). Each highlighting event can include a selected clip, along with the tagging information generated for the selected clip. The expert knowledge base and the second LLM model can be used to evaluate these highlighting events, such as to determine a completion score (which can be compared with historical scores or a target score) or to provide further guidance and suggestions for the paragliding action, such as how to improve paragliding actions in the future, which can be saved as additional tagging information for the corresponding highlighting event.

In some implementations, an instruction to provide a recommendation to the individual can be generated based on the first measurement and the personalized multimedia lifelog entry for the individual using at least one of the first LLM model or the second LLM model. For example, the instruction can be generated to provide a recommendation (e.g., "have a plate of red meat to supplement protein") to the individual during mealtime based on the personalized multimedia lifelog entry that indicates that the user just burned 500 calories in the gym, and the first measurement of any of the physiological or environmental parameter discussed above. The instruction to provide the recommendation can also be based on the second measurement discussed above or any additional measurement(s).

In some implementations, at the operation 306, at least one object is detected by the at least one processor of the at least one wearable device from the selected clip based on the tagging information; and a task associated with the at least one object is determined using the machine learning model. For example, objects that can be detected from the selected clip based on the tagging information may include a person/animal in the selected clip or the food a user is consuming. The task associated with the at least one object determined from the selected clip using the machine learning model can include, for example, taking a high-resolution photo for each food item for analysis and/or uploading to the server.

In some implementations, a parameter derived from the first measurement is used to determine a type of the at least one object in the task. In an example, the type of drinks (e.g., alcohol or nonalcoholic beverages) can derived from a measurement by a VOC sensor of the at least one wearable device.

In some implementations, the operation 306 further includes transmitting, by the at least one wearable device to a recipient monitoring the triggering event for the individual, the selected clip edited to include the tagging information with an alert. For example, the alert can be a warning message to a recipient (such as a caretaker associated with the individual) along with the selected clip and the tagging information. The alert can include information derived from the first measurement, the second measurement, any other physiological or environmental parameter, or the like. For example, the alert can include, e.g., heart rate or blood pressure values of the individual when the triggering event is determined to have occurred.

As another illustrative use case example, the process 300 can be implemented in a healthcare alert scenario. For example, a very senior woman lives alone. She has diabetes and is overweight but otherwise doing fine. Her primary caretaker is her son, who lives away for work, so they decided that she would wear the at least one wearable device (such as the device 100 in FIG. 1 or the computing device 200 in FIG. 2). Her three meals per day are recorded by the camera of the at least one wearable device, and the video clips and corresponding tagging information are generated and saved, which can be viewed by her caretaker son at any time. The tagging information is generated based on the measurements from the at least one wearable device such as to indicate that the pace of her daily life is relaxed, that she is having regular meals, that she is taking the diabetes medicine regularly, or that she gets out for a walk when the weather is nice, etc. One day, however, the son received an alert on his mobile device, which was sent from his mother's mobile device in communication with the at least one wearable device. The alert included a video clip and the tagging information indicating that the blood pressure of his mom suddenly went up from 140 mmHg to 170 mmHg during lunch, and her heart rate also went up from 75 bpm to 98 bpm. The video clip showed that she did not finish lunch before leaving for the bedroom. The son called his mom while she was still in bed. She told him that she had a headache and felt nauseous. He rushed to her side, and took her to the emergency room (ER). She was diagnosed with brain stroke. Fortunately, with timely treatment, she recovered. She was given new prescriptions and sent home. The at least one wearable device continues to monitor the medicine intake, which includes the new prescriptions, and continues to obtain measurements of physiological/environmental parameters as before to determine if any triggering event has occurred (e.g., sudden increase of blood pressure or heart rate, among others).

Figure 4:
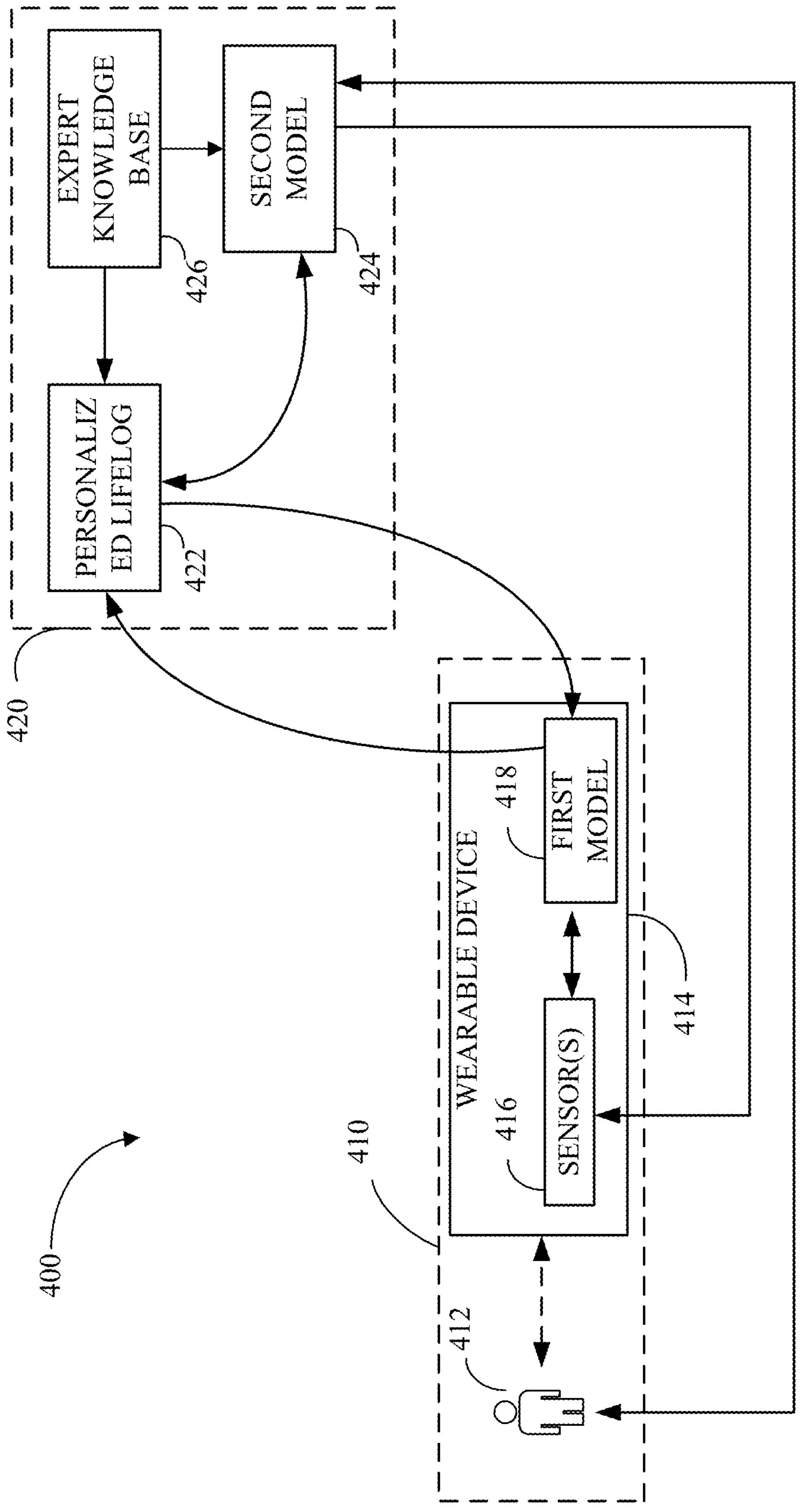
FIG. 4 is a flow diagram of an example system of multimodal multimedia processing using at least one wearable device according to some implementations of this disclosure.

FIG. 4 illustrates an example system 400 of multimodal multimedia processing using at least one wearable device according to some implementations of this disclosure. The at least one wearable device can be, for example, the device 100 in FIG. 1 or the computing device 200 in FIG. 2. The system 400 can be similar to, or based upon, the process 300 of FIG. 3. Without repeating every detail already described in the process 300, the system 400 is described below with reference to the process 300 and the examples therein. The system 400 can include a user site 410, and a server 420 such as a cloud server. The user site 410 can include a user 412 and a wearable device 414 associated with the user 412. The wearable device 414 can include the at least one wearable device discussed above in connection with the process 300. The wearable device 414 can include sensor(s) 416, such as an image sensor and/or other sensors, to take measurements of at least one of a physiological parameter of the user 412 or an environmental parameter captured in a vicinity of the user 412, as discussed above in connection with the operation 302.

The wearable device 414 can also include a first model 418 such as a machine learning model adapted to run on at least one processor of the wearable device 414. The first model 418 can be implemented as software, firmware or hardware in the wearable device 414. As discussed above in connection with the operation 304, the measurements can be used to determine whether a triggering event has occurred and the triggering event is associated with generating tagging information based on the measurements using the machine learning model adapted to run on the wearable device 414 such as the first model 418.

In some implementations, the first model 418 can include, for example, a first large language model (LLM) customized for the user 412 and adapted to run on the at least one processor of the wearable device 414. The first model 418 can be used to perform peripheral computing such as generating contents and tasks for the wearable device 414 locally. The peripheral computing can be performed using the first LLM, which is usually much smaller and requires much fewer computational resources than a second model 424 on the server 420. The second model 424 can include a second LLM, and the first LLM at the wearable device 414 is sometimes referred to as a light weight LLM. The first model 418 can be used to generate, for example, tagging information based on the measurements taken by the sensor (s) 416 of the wearable device 414. The tagging information can be generated for a selected clip from a multimedia stream currently being captured by the image sensor of the wearable device 414, as discussed above in connection with the operation 306. The selected clip can be edited to include the tagging information.

For example, the physiological parameter can include at least one of: heart rate, heart rate variability (HRV), blood pressure, blood glucose level, respiration rate, body temperature, or other physiological information that can be measured for the individual. The environmental parameter can include at least one of: altitude, GPS location, ambient temperature, ambient humidity, ambient noise index, an environmental pollution index, or other environmental parameter that can be captured by the at least one wearable device in the vicinity of the individual.

In some implementations, the wearable device 414 comprises the image sensor and a second sensor, wherein the second sensor performs multimodal cooperation with the image sensor. For example, the first measurement can be obtained by the second sensor of a same device as the image sensor, the second sensor of a different device as the image sensor, or the image sensor itself.

The server 420 can include the second model 424, an expert knowledge base 426 that interacts with the second model 424, and a personalized (multimedia) lifelog 422. Tasks to be performed by the image sensor or another sensor of the wearable device 414 can be generated by the first model 418, the second model 424, or both. The second model 424 can also interact with the user 412 directly. More complex tasks, such as updating the personalized lifelog 422, complex semantic parsing or task generation from the personalized lifelog 422 over time, and high-level life coaching can be performed using the second LLM and the expert knowledge base 426. The expert knowledge base 426 can be, for example, a domain knowledge database. By interacting with the second model 424 at the server 420, and taking inputs from the first model 418 at the user site 410 and the expert knowledge base 426 at the server 420, the personalized lifelog 422 can be enriched and used to carry out complex tasks such as high-level life coaching.

As another illustrative use case example, the system 400 can be implemented in a restaurant blogging scenario. A user, such as the user 412, goes to a restaurant for dinner wearing the wearable device 414. After the user 412 is seated, the camera of the wearable device 414 is turned on and starts recording the dinner. In addition to taking the video from a first-person perspective, the camera or another sensor of the wearable device 414 can be used to measure environmental parameters in the restaurant, or physiological parameters of the user 412, or both. As the restaurant gets noisy during dinner time, the user 412 puts on his headphones. Upon determining that the user 412 has put on the headphones, a light music piece is recommended to the user 412 using the first model 418 based on measurement(s) of the environmental parameters sensed by the wearable device 414, such as restaurant ambience. While getting recommendation of signature dishes from the waitperson, the user 412 asks the first model 418 for guidance on what he should eat. The user 412 is told that, since he just burned 500 calories in the gym, it is best to have a plate of red meat to supplement protein. Based on the waitperson's recommendation of signature dishes and the guidance of the first model 418, the user 412 orders a glass of red wine and a three-course meal (sweet and sour pork, spinach salad and fish soup).

Shortly afterwards, the dishes and the glass of wine are brought to the table of the user 412 one by one, which are recorded by the camera of the wearable device 414. The ingredients and calories of each dish can be determined by, for example, image analysis, such as the ingredients and calories of each dish, which can be performed using the first model 418. The camera also takes high-resolution photos for each dish. For example, the camera can be in a preview mode and continuously take low-resolution videos, the content of which can be analyzed by the first model 418. Once a triggering event/item such as a dish is detected, the first model 418 can instruct the camera to take one or more high resolution photos for the dish, which can be used for more precise image recognition and analysis of ingredients and calories. Some or all of these mentioned above are used to generate tagging information for the corresponding video clip. In addition, for example, the VOC sensor in the camera (or another sensor of the wearable device 414) senses alcohol, which can help to determine that the drink brought to the user 412 is wine, not soft drink, tea or fruit juice of the same color, so the tagging information can be generated to include "glass of wine" for the corresponding video clip.

When the user 412 starts to eat, the first model 418 or the second model 424 can generate user guidance through the headphones, such as suggesting to the user 412 to have the fish soup first, and then the sweet and sour pork, in order to slow down the body's absorption of sugar to avoid a sudden spike in blood sugar level, since the fish soup has a lot of protein. Another suggestion can be to have a piece of bread with the fish soup if the user 412 is feeling hungry. The user 412 follows the suggestions. After dinner, the user 412 turns off the camera of the wearable device 414. The user 412 then receives a meal summary generated by the first model 418 or the second model 424 that he has consumed 1,200 calories, and an excellent score. The selected video clips of the dinner with the tagging information associated with each video clip, such as the video clips showing each dish with their ingredient and calories, the high-resolution photos and the meal summary are uploaded to the server 420 and saved in the personalized (multimedia) lifelog 422 of the user 412.

Technical specialists skilled in the art should understand that the implementations in this disclosure may be implemented as methods, systems, or computer program products. Therefore, this disclosure may be implemented in forms of a complete hardware implementation, a complete software implementation, and a combination of software and hardware implementation. Further, this disclosure may be embodied as a form of one or more computer program products which are embodied as computer executable program codes in computer writable storage media (including but not limited to disk storage and optical storage).

This disclosure is described in accordance with the methods, devices (systems), and flowcharts and/or block diagrams of computer program products of the implementations, which should be comprehended as each flow and/or block of the flowcharts and/or block diagrams implemented by computer program instructions, and the combinations of flows and/or blocks in the flowcharts and/or block diagrams. The computer program instructions therein may be provided to generic computers, special-purpose computers, embedded computers or other processors of programmable data processing devices to produce a machine, wherein the instructions executed by the computers or the other processors of programmable data processing devices produce an apparatus for implementing the functions designated by one or more flows in the flowcharts and/or one or more blocks in the block diagrams.

The computer program instructions may be also stored in a computer readable storage which is able to boot a computer or other programmable data processing device to a specific work mode, wherein the instructions stored in the computer readable storage produce a manufactured product containing the instruction devices which implements the functions designated by one or more flows in the flowcharts and/or one or more blocks in the block diagrams.

The computer program instructions may also be loaded to a computer or another programmable data processing device to execute a series of operating procedures in the computer or the other programmable data processing device to produce a process implemented by the computer, whereby the computer program instructions executed in the computer or the other programmable data processing device provide the operating procedures for the functions designated by one or more flows in the flowcharts and/or one or more blocks in the block diagrams.

Apparently, the technical specialists skilled in the art may perform any variation and/or modification to this disclosure by the principles and within the scope of this disclosure. Therefore, if the variations and modifications herein are within the scope of the claims and other equivalent techniques herein, this disclosure intends to include the variations and modifications thereof.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms “a,” “an,” “the” include plural referents unless the context clearly dictates otherwise. The term “comprising”, and variations thereof as used herein is used synonymously with the term “including” and variations thereof and are open, non-limiting terms. The terms “optional” or “optionally” used herein mean that the subsequently described feature, event or circumstance may or may not occur, and that the description includes instances where said feature, event or circumstance occurs and instances where it does not. The terms “at least one of A or B,” “at least one of A and B,” “one or more of A or B,” “A and/or B” used herein mean “A”, or “B” or “A and B”.

While the disclosure has been described in connection with certain embodiments or implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of multimodal multimedia processing for at least one wearable device comprising an image sensor, a physiological sensor other than the image sensor, and at least one processor, the method comprising:

in response to the image sensor of the at least one wearable device being turned on, obtaining, by the at least one wearable device, a first measurement of a first physiological parameter of an individual captured by the physiological sensor;

determining, by the at least one processor of the at least one wearable device, whether a triggering event has occurred based on the first measurement, the triggering event associated with generating tagging information based on the first measurement for the image sensor of the at least one wearable device using a machine learning model adapted to run on the at least one processor of the at least one wearable device; and in response to determining that the triggering event has occurred, editing, by the at least one processor of the at least one wearable device, a selected clip from a multimedia stream currently being captured by the image sensor of the at least one wearable device to include the tagging information generated based on the first measurement at a corresponding timestamp.

2. The method of claim 1, wherein the first measurement further comprises a first environmental parameter in a vicinity of the individual, captured by an environmental sensor of the at least one wearable device in response to the image sensor of the at least one wearable device being turned on, wherein the physiological sensor and the environmental sensor performs multimodal cooperation with the image sensor.

3. The method of claim 1, wherein determining, by the at least one processor of the at least one wearable device, whether the triggering event has occurred based on the first measurement further comprises:

obtaining, by the at least one wearable device, a second measurement of at least one of a second physiological parameter of the individual captured by the physiological sensor or a second environmental parameter captured by environmental sensor of the at least one wearable device in a vicinity of the individual; and determining, by the at least one processor of the at least one wearable device, whether the triggering event has occurred based on the first measurement and the second measurement.

4. The method of claim 3, wherein the environmental parameter comprises at least one of: altitude, GPS location, ambient temperature, ambient humidity, ambient noise index, or an environmental pollution index.

5. The method of claim 1, wherein the tagging information comprises the first measurement, information extracted from the multimedia stream, and the corresponding timestamp, or the first physiological parameter comprises at least one of: heart rate, heart rate variability, blood pressure, blood glucose level, body temperature, or respiration rate.

6. The method of claim 1, wherein the selected clip is to be analyzed with other tagged clips to determine a personalized multimedia lifelog entry.

7. The method of claim 6, wherein the machine learning model adapted to run on the at least one processor of the at least one wearable device comprises a first large language model customized for the individual and adapted to run on the at least one processor of the at least one wearable device, the method further comprising:

sending the selected clip to a server, wherein the selected clip including the tagging information is analyzed to update the personalized multimedia lifelog entry using a second large language model and an expert knowledge base interacting with the second large language model.

8. The method of claim 7, further comprising:

generating, by the at least one processor of the at least one wearable device, an instruction to direct the image sensor of the at least one wearable device to switch to perform a task based on the first measurement, wherein the task is generated using at least one of the first large language model or the second large language model.

9. The method of claim 8, wherein the task to be performed by the image sensor of the at least one wearable device comprises at least one of: updating a frame rate of the multimedia stream currently being captured, or taking a high-resolution still photo.

10. The method of claim 7, further comprising:

generating, by the at least one processor of the at least one wearable device, an instruction to provide a recommendation to the individual based on the first measurement and the personalized multimedia lifelog entry for the individual using at least one of the first large language model or the second large language model.

11. The method of claim 1, further comprising:

detecting, by the at least one processor of the at least one wearable device, at least one object from the selected clip based on the tagging information; and determining a task associated with the at least one object using the machine learning model.

12. The method of claim 11, wherein a parameter derived from the first measurement is used to determine a type of the at least one object in the task.

13. The method of claim 1, further comprising:

transmitting, by the at least one wearable device to a recipient monitoring the triggering event for the individual, the selected clip edited to include the tagging information with an alert.

14. A non-transitory computer-readable storage medium configured to store computer programs for multimodal multimedia processing using at least one wearable device, the computer programs comprising instructions executable by at least one processor to perform the method of claim 1.

15. A wearable system for multimodal multimedia processing, comprising:

an image sensor;

a physiological sensor;

a non-transitory memory; and at least one processor configured to execute instructions stored in the non-transitory memory to:

in response to the image sensor being turned on, obtain a first measurement of a first physiological parameter of an individual from the physiological sensor;

determine whether a triggering event has occurred based on the first measurement, the triggering event associated with generating tagging information based on the first measurement for the image sensor using a machine learning model adapted to run on the at least one processor; and in response to determining that the triggering event has occurred, edit a selected clip from a multimedia stream currently being captured by the image sensor to include the tagging information generated based on the first measurement at a corresponding timestamp.

16. The wearable system of claim 15, wherein the physiological sensor performs multimodal cooperation with the image sensor, and the instructions to determine whether a triggering event has occurred based on the first measurement comprise instructions to:

obtain, by the physiological sensor, a second measurement of at least one of a second physiological parameter of the individual or an environmental parameter captured by an environmental sensor in a vicinity of the individual; and determine, by the at least one processor, whether the triggering event has occurred based on the first measurement and the second measurement.

17. The wearable system of claim 16, wherein the first physiological parameter comprises at least one of: heart rate, heart rate variability, blood pressure, blood glucose level, body temperature, or respiration rate, and the environmental parameter comprises at least one of: altitude, GPS location, ambient temperature, ambient humidity, ambient noise index, or an environmental pollution index, and the tagging information comprises the first measurement, information extracted from the multimedia stream, and the corresponding timestamp.

18. The wearable system of claim 15, wherein the selected clip is to be analyzed with other tagged clips to determine a personalized multimedia lifelog entry, and the machine learning model adapted to run on the at least one processor comprises a first large language model customized for the individual and adapted to run on the at least one processor, and the instructions stored in the non-transitory memory further comprise instructions to:

send the selected clip to a server, wherein the selected clip including the tagging information is analyzed to update the personalized multimedia lifelog entry using a second large language model and an expert knowledge base interacting with the second large language model.

19. The wearable system of claim 18, wherein the instructions stored in the non-transitory memory further comprise instructions to:

generate an instruction to direct the image sensor to switch to perform a task based on the first measurement, wherein the task is generated using at least one of the first large language model or the second large language model; or generate an instruction to provide a recommendation to the individual based on the first measurement and the personalized multimedia lifelog entry for the individual using at least one of the first large language model or the second large language model.

* * * * *